Aug. 8, 1939.  J. H. DORAN  2,169,092
TURBINE-CASING JOINT
Filed Sept. 11, 1937  2 Sheets-Sheet 1

Inventor:
John H. Doran,
by Harry E. Dunham
His Attorney.

Aug. 8, 1939. J. H. DORAN 2,169,092
TURBINE-CASING JOINT
Filed Sept. 11, 1937 2 Sheets-Sheet 2
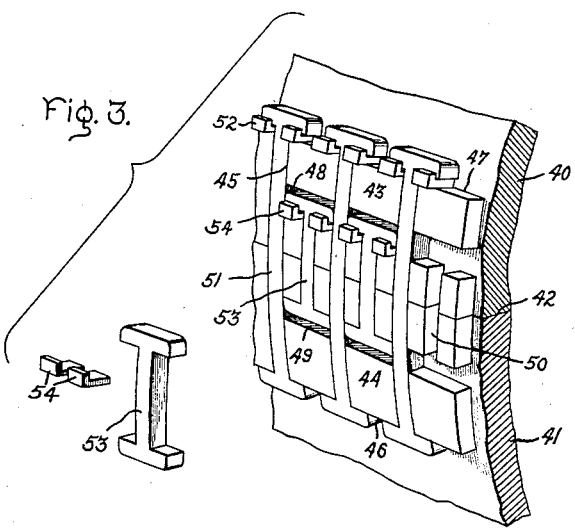
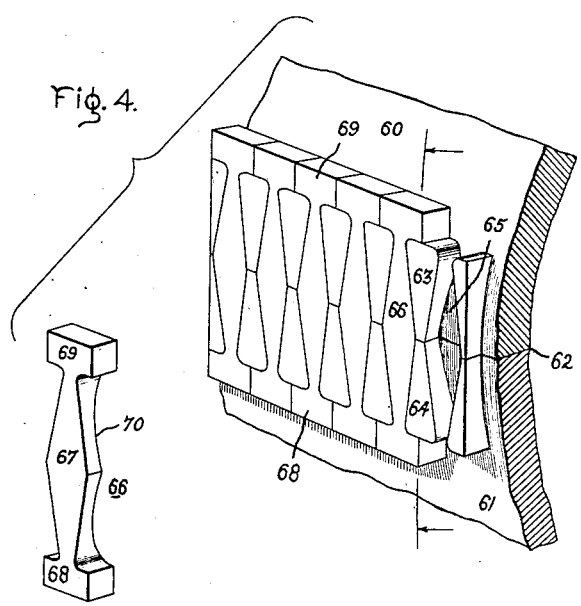
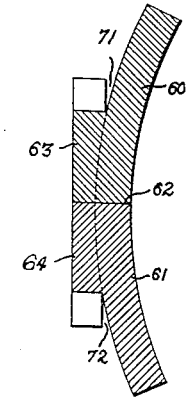
Inventor:
John H. Doran,
by Harry E. Dunham
His Attorney.

Patented Aug. 8, 1939

2,169,092

UNITED STATES PATENT OFFICE 2,169,092

TURBINE-CASING JOINT

John H. Doran, Scotia, N. Y., assignor to General Electric Company, a corporation of New York Application September 11, 1937, Serial No. 163,506

2 Claims. (Cl. 285—129)

The present invention relates to elastic fluid turbine casings, more specifically to the type of casings which comprises two casing halves or portions flanged together, although it is not limited thereto necessarily. Modern elastic fluid turbines operated at fluid pressures of 700 pounds per square inch and more and temperatures of 1000° F. and above are subject to considerable strains and stresses during operation. Hence, in the design of turbine casings, special attention must be paid securely and safely to connect or fasten together the casing halves.

The general object of my invention is to provide an improved construction and arrangement of casings and an improved method of making, assembling and dismantling them whereby several halves or portions of such casing are rigidly and safely secured together.

For a consideration of what I believe to be novel and my invention, attention is directed to the following description and the claims appended thereto in connection with the accompanying drawings.

Figure 1:
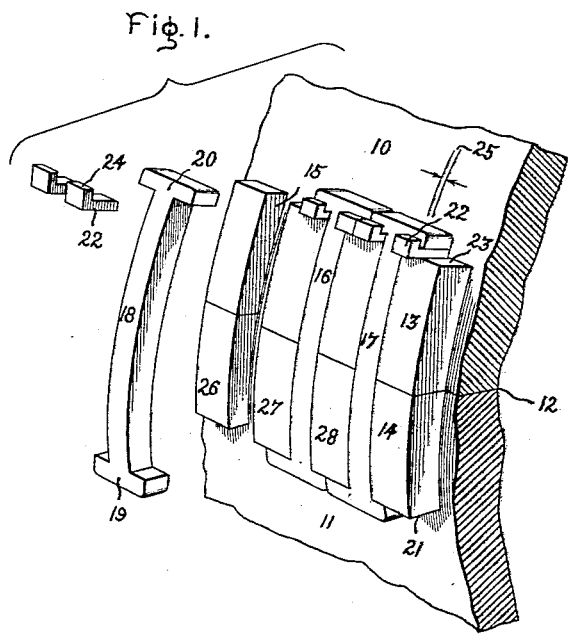
Figure 2:
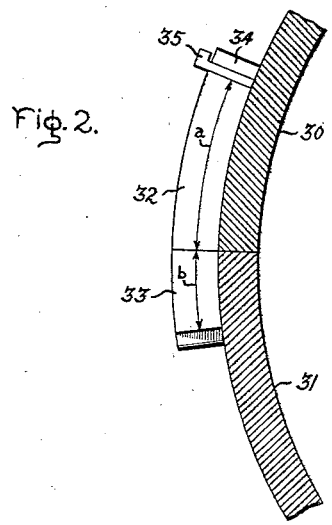

In the drawings Fig. 1 illustrates a perspective view of a turbine casing, partly broken away, and embodying my invention; Figs. 2, 3, and 4 show modifications of my invention and Fig. 5 is a sectional view along the line 5—5 of Fig. 4.

The casing shown in Fig. 1 comprises an upper half 10 and a lower half 11 engaging each other along a joint 12. In order rigidly to secure the two halves together I provide each of them near the joint 12 with a flange 13 and 14, respectively. These flanges may be formed in known manner by casting or forging them together with the corresponding casing halves or by welding them thereto. The flanges 13 and 14 engage each other and are provided in accordance with my invention, with circumferentially extending grooves 15 for accommodating links or clamps 16, 17. In the present instance, these links are essentially double-T or I shaped, each having a main or body portion 18, a lower transverse portion 19 and an upper transverse portion 20. The main or body portion 18 has an inner curved surface conforming to the curvature of the outer surfaces of the casing halves and the flanges. The lower transverse portions 19 bear against the lower end surfaces 21 of the flange 14. Keys or washers 22 are inserted on opposite sides of the body portion 18 between the upper transverse portions 20 and the upper end face 23 of the flange 13. During assembly, the links or clamps 16, 17 are heated and shrunk onto the flanges 13, 14 to fasten them securely together. Dismantling is accomplished by first heating the links and then removing the keys 22. Each key has a head 24 which is sufficiently spaced from the adjacent upper transverse portion 20 as indicated at 25, to permit insertion of a tool for removal of the key.

During manufacture of the flanged casing halves the flanges may first be formed solid and thereupon grooves 15 cut into the flanges or the grooves may be formed initially by forming on each casing half near its joint or end face a plurality of projections 26, 27, 28. As the engagement between the sides of the body portions 18 with the adjacent sides of the projections 26, 27, 28 is not essential, subsequent machining of the grooves may be omitted, it being sufficient to machine only the end faces 21 and 23 of the separately formed projections 26, 27, and 28.

The arrangement in Fig. 2 comprises an upper casing half 30, and a lower casing half 31 formed with projections 32 and 33 respectively and secured together by means including links or clamping members 34 and keys 35. While the circumferential length of the flanges 13 and 14 of the arrangement of Fig. 1 are alike, the circumferential length a of the projection 32 in the arrangement of Fig. 2 is considerably longer than the circumferential length b of the projection 33 in order to facilitate assembly and disassembly of the structure.

The arrangement of Fig. 3 comprises an upper casing half 40 and a lower casing half 41 engaging the upper casing half along a joint 42. Each casing half near the joint is provided with a flange 43 and 44 respectively. A plurality of vertically or circumferentially extending grooves 45 are cut into the flanges extending from the lower face 46 of the flange 44 to the upper face 47 of the flange 43. A horizontally or substantially axially extending groove 48 is cut into the flange 43 between the joint 42 and the upper face 47 of said flange 43, and a similar horizontally extending groove 49 is cut into the flange 44. Finally another groove 50 is formed between adjacent grooves 45 extending vertically or circumferentially from the horizontal groove 49 to the horizontal groove 48. The two flanges or the projections forming them are rigidly secured together by long links 51 and keys 52, and by short links 53 and similar keys 54, located in the grooves 45 and 50 respectively. As can be readily seen from the drawings the transverse portions of the long and the short links overlap each other. This overlapping arrangement permits the provision of a great many linking or shrinking elements within a comparatively small space.

The arrangement in Figs. 4 and 5 includes an upper casing half 60 and a lower casing half 61 forming a joint 62. The casing halves near the joint 62 are provided with flanges or projections 63 and 64 respectively. Vertically extending grooves 65 are formed in the flanges 63, 64 to accommodate shrinking members or links 66 for securing the two halves together. The arrangement is such that the outer surfaces of the link 66 and the flanges 63, 64 form together a plain vertical surface. Each link 66 has a main or body portion 67 whose width reduces gradually towards transverse end portions 68 and 69. The outer surface of each link is plain while its corresponding opposite surface 70 is curved to conform to the curvature of the casing halves 60, 61. The transverse portions with the adjacent portions of the casing half form grooves 71 and 72 respectively, permitting the insertion of a tool or tools during the dismantling of the structure, hence, special removable keys or washers are not required in this design, but may be used if found desirable.

Having described the method of operation of my invention, together with the apparatus which I now consider to represent the best embodiments thereof, I desire to have it understood that the apparatus shown is only illustrative and that the invention may be carried out by other by means.

What I claim as new and desire to secure by Letters Patent of the United States, is:

1. An elastic fluid turbine casing having lower and upper casing halves with flanges and forming a joint, a plurality of open grooves in the flanges extending transversely to the joint, clamps for shrinking the flanges together, said clamps having main portions disposed in the grooves and transverse portions engaging the end surfaces of the flanges, and means to facilitate dismantling of the clamps comprising keys disposed between the transverse portions and the adjacent end surfaces of one of the flanges.

2. A casing having upper end lower casing halves with flanges forming a joint, a plurality of first open grooves extending circumferentially transverse to the joint from one end face of one flange to the other end face of the other flange, a second open groove extending parallel to the joint formed in each flange, a third open groove formed between each pair of first grooves and extending parallel thereto between the second grooves, and clamping means having body portions disposed in the first and third grooves for shrinking the flanges together.

JOHN H. DORAN.